United States Patent
Wang et al.

(10) Patent No.: US 6,783,367 B1
(45) Date of Patent: Aug. 31, 2004

(54) METHOD AND SYSTEM FOR PROVIDING A GLOBAL PRODUCT SERVICES ELECTRONIC LABORATORY

(75) Inventors: Geefu Wang, Fremont, CA (US); Douglas Hong, So. San Francisco, CA (US); Chun Wu, Alameda, CA (US); Thuy Le, Santa Clara, CA (US); Yu-Tien Chi, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 222 days.

(21) Appl. No.: 10/079,227

(22) Filed: Feb. 19, 2002

(51) Int. Cl.[7] .............................................. G09B 23/00
(52) U.S. Cl. ........................ 434/276; 434/219; 434/350; 434/362; 434/365; 382/133; 705/2
(58) Field of Search ................................ 434/118, 169, 434/201, 219, 276, 307 R, 308, 322, 323, 335, 350, 362, 365, 432; 345/419, 420; 600/300, 437; 382/133; 700/104, 250, 266, 3; 702/84, 104, 187; 705/2, 28; 707/500.1; 709/204, 218, 220; 455/414.1

(56) References Cited

U.S. PATENT DOCUMENTS

| | | | |
|---|---|---|---|
| 4,793,813 A * 12/1988 | Bitzer et al. ................ 434/335 |
| 5,046,022 A *  9/1991 | Conway et al. ............. 700/250 |
| 5,065,315 A * 11/1991 | Garcia ............................ 705/2 |
| 5,484,293 A *  1/1996 | Ford et al. ................... 434/432 |
| 5,748,907 A *  5/1998 | Crane ............................. 705/2 |
| 5,813,865 A *  9/1998 | Greenbowe et al. ........ 434/276 |
| 5,831,848 A * 11/1998 | Rielly et al. .................. 700/3 |
| 6,018,768 A *  1/2000 | Ullman et al. .............. 709/218 |
| 6,055,487 A *  4/2000 | Margery et al. .............. 702/84 |
| 6,058,374 A *  5/2000 | Guthrie et al. ................ 705/28 |
| 6,097,995 A *  8/2000 | Tipton et al. ................ 700/266 |
| 6,230,066 B1 *  5/2001 | Sferro et al. ................ 700/104 |
| 6,261,103 B1 *  7/2001 | Stephens et al. ............ 434/276 |
| 6,272,235 B1 *  8/2001 | Bacus et al. ................ 382/133 |
| 6,499,054 B1 * 12/2002 | Hesselink et al. .......... 709/204 |
| 6,629,060 B2 *  9/2003 | Okuno et al. ................ 702/187 |
| 6,652,456 B2 * 11/2003 | Gelfand et al. ............. 600/300 |
| 2002/0049782 A1 *  4/2002 | Herzenberg et al. ...... 707/500.1 |
| 2002/0147799 A1 * 10/2002 | Alhalabi et al. ............ 709/220 |
| 2002/0198454 A1 * 12/2002 | Seward et al. .............. 600/437 |
| 2003/0154044 A1 *  8/2003 | Lundstedt et al. .......... 702/104 |
| 2003/0181196 A1 *  9/2003 | Davidov et al. .......... 455/414.1 |

* cited by examiner

*Primary Examiner*—Joe H. Cheng

(57) ABSTRACT

One embodiment of the present invention provides a global product services electronic laboratory (E-Lab). For example, the E-Lab may be an on-line virtual laboratory for company employees and/or field engineers for learning how to implement new technology products via actual "hands-on" configurations and troubleshooting. Specifically, the E-Lab of the present embodiment enables an authorized user to utilize a computing device to remotely access the E-Lab via the Internet, a company network or a dial-up connection. Once communicatively coupled to the E-Lab, the user is provided a variety of different topics and categories associated with the products and/or equipment labs currently available within the E-Lab. After selecting one of the topics or categories, the user may be provided more specific information regarding tutorials and/or troubleshooting corresponding to the selected lab equipment. Additionally, the user is able to directly interact with the actual equipment on-line thereby having a "hands-on" learning experience.

35 Claims, 3 Drawing Sheets

METHOD AND SYSTEM FOR PROVIDING A GLOBAL PRODUCT SERVICES ELECTRONIC LABORATORY

TECHNICAL FIELD

The present invention relates to the field of training and/or education and service and/or support. More specifically, the present invention relates to the field of implementing training and/or education and service and/or support for products and/or equipment.

BACKGROUND ART

Currently, there are several different techniques for training individuals to learn about technology theory and/or new products. For example, one technique for training one or more students is to provide them manuals and documentation to read associated with the specific technology theory and/or new products. However, there are disadvantages associated with this type of training technique. Specifically, having students just reading manuals and documents without any human interaction may be a time consuming and tedious approach. Additionally, another disadvantage is that there is typically not a knowledgeable authority present for answering a student's questions. Furthermore, the lack of a tactile setting to learn about technological products usually leaves students with a theoretical knowledge but no applied knowledge.

Another technique for training individuals to learn about technology theory and/or new products is a classroom setting taught by a trained instructor having some or all corresponding technology and products present. As such, the classroom technique overcomes the disadvantages associated with the reading technique. That is, the classroom training technique is able to provide students with applied knowledge and also provide a knowledgeable authority to respond to students questions. However, there are also disadvantages associated with the classroom training technique. For instance, if the instructor led training occurs in a remote location (e.g., a distant city, town, state or country), there are direct and indirect expenditures associated with sending a person to attend the class such as air travel, lodging, food and the lost revenue associated with having the person away from their work responsibilities for one or more days. Furthermore, in a classroom setting, multiple sets of equipment may also need to be purchased for a proper equipment-to-student ratio in order to ensure effective learning. However, multiple sets of equipment may become expensive as the student ratio increases. Another disadvantage is the lack of flexibility in keeping the training fresh within the student's mind. For example, the student may not recall most of the critical information at the time of performing service procedures after classroom training was conducted several weeks or months ago.

An additional technique for training individuals to learn about technology theory and/or new products is to provide simulation tools that may be utilized in conjunction with a computer system. For example, a company may create a compact disc (CD) simulation tool which it may provide to individuals desiring to learn more about their new technological product. As such, the CD simulation tool usually includes a user interface of the technological product along with some limited functionality associated with the product. It should be understood that there are also disadvantages associated with this simulation tool training technique. For instance, one disadvantage is that users of the simulation tool are typically limited to just simulation training and do not have access to and interaction with the physical technological product and/or equipment.

Yet another technique for training individuals to learn about technology theory and/or new products is to provide a virtual lab that may be utilized in conjunction with a computer system. Specifically, the typical virtual lab allows individuals to remotely access it via the Internet and interact with actual technological products. However, there are disadvantages associated with this type of virtual lab training technique. For example, the typical virtual lab usually only provides a command-line interface (CLI) for interacting with the product which can be challenging for individuals to learn and use. Furthermore, another disadvantage is that if a student's Internet connection becomes inoperative (goes down) or an Internet connection is unavailable, the student is substantially precluded from accessing and utilizing the virtual lab.

SUMMARY OF THE INVENTION

Accordingly, a need exists for a method and system for training individuals to learn about technology theory and/or new products which provides a way to have questions answered, provides theoretical knowledge along with applied knowledge and is not tedious. Additionally, a need exists for a method and system which satisfies the above mentioned needs and does not require an individual to travel to a distant location. Furthermore, a need exists for a method and system which satisfies the above mentioned needs and does not involve simulation, but instead provides real-time physical access to actual equipment. Moreover, a need exists for a method and system which satisfies the above mentioned needs and is not limited to just providing a command-line interface with the product. A need also exists for a method and system which satisfies the above mentioned needs and provides more than one communication path to access the training. The present invention provides methods and systems which accomplish the above mentioned needs.

For example, one embodiment of the present invention provides a global product services electronic laboratory (E-Lab). For example, the E-Lab may be an on-line virtual laboratory for company employees and/or field engineers for learning how to implement new technology products via actual "hands-on" configurations and troubleshooting. Specifically, the E-Lab of the present embodiment enables an authorized user to utilize a computing device to remotely access the E-Lab via the Internet, a company network or a dial-up connection. Once communicatively coupled to the E-Lab, the user is provided a variety of different topics and categories associated with the products and/or equipment labs currently available within the E-Lab. After selecting one of the topics or categories, the user may be provided more specific information regarding tutorials and/or troubleshooting corresponding to the selected lab equipment. Additionally, the user is able to directly interact with the actual equipment on-line thereby having a "hands-on" learning experience.

In another embodiment, the present invention includes a method for providing an electronic laboratory for learning purposes that includes a physical product having an interface that is utilized by a remote computing device. The method includes establishing the electronic laboratory to include the physical product. Furthermore, the method includes enabling the remote computing device to communicate with the electronic laboratory and the physical product via a first communication path or a second communication path.

Additionally, the method includes scheduling a time slot wherein the remote computing device may interact with the physical product. In response to the time slot substantially beginning, the method includes enabling the remote computing device to interact with the interface of the physical product of the electronic laboratory for learning purposes.

In yet another embodiment, the present invention includes a computer readable medium having computer readable code embodied therein for causing a system to perform in a particular manner. The computer readable medium causes the system to perform enabling a remote computing device to communicate with an interface of a physical product of an electronic laboratory via a first communication path or a second communication path. Additionally, the computer readable medium causes the system to perform scheduling a time slot wherein the remote computing device may access the interface of the physical product. In response to the time slot substantially beginning, the computer readable medium causes the system to perform enabling the remote computing device to access the interface of the physical product of the electronic laboratory for learning purposes.

In still yet another embodiment, the present invention includes, a system for providing an electronic laboratory for learning purposes including a physical product having an interface that is utilized by a remote computing device. The system includes the electronic laboratory which includes the physical product having the interface. Furthermore, the system includes a server coupled to the physical product and for providing and controlling access to the physical product. The system also includes a first communication network coupled to the server and for enabling the remote computing device to communicate with the server and the physical product. Additionally, the system includes a second communication network coupled to the server and for enabling the remote computing device to communicate with the server and the physical product.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
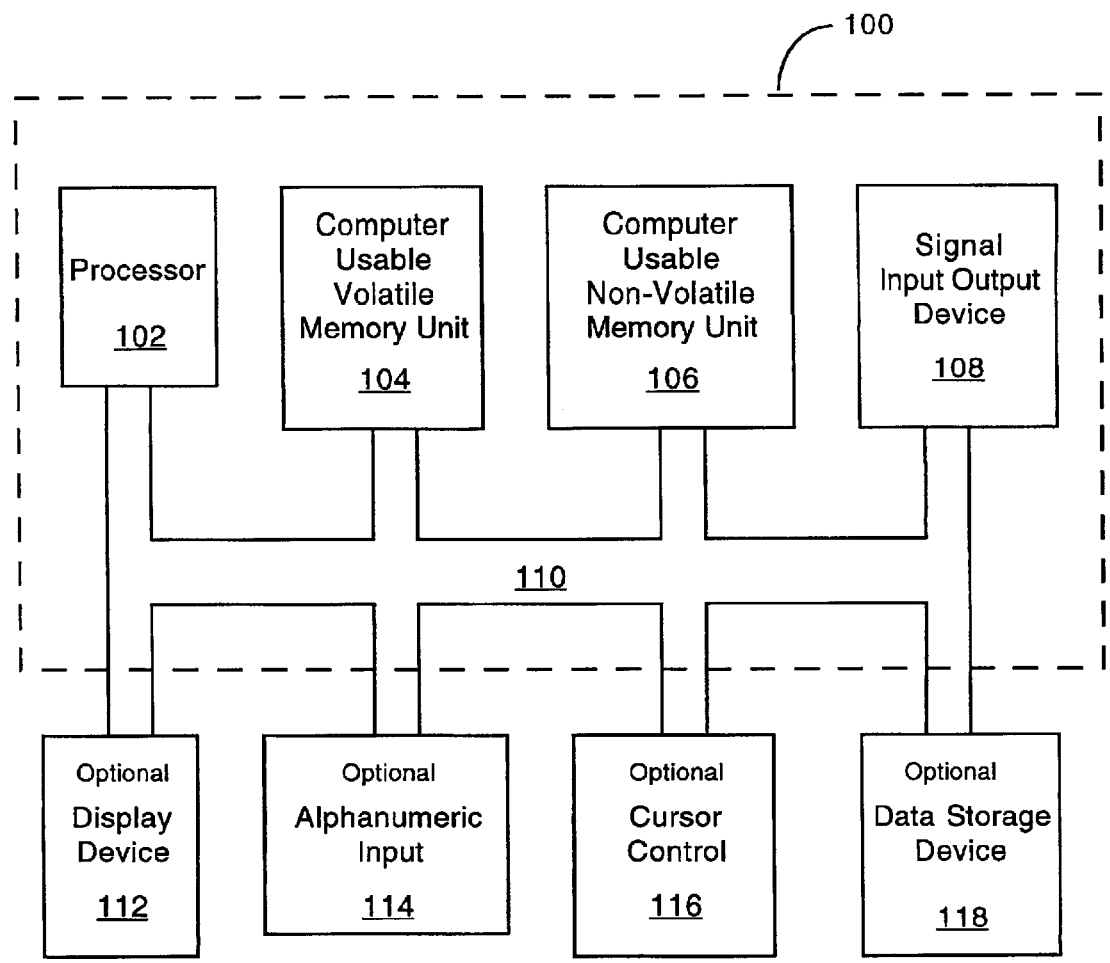
FIG. 1 is a block diagram of an exemplary computer system used in accordance with an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within an electronic computing device or memory system. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computing system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "enabling", "establishing", "scheduling", "providing", "controlling", "indicating", "generating", "determining", "selecting", "outputting", "transmitting", "locating", "storing", "receiving", "utilizing", "providing", "displaying" or the like, may refer to the action and processes of a computing system, or similar electronic computing device, that manipulates and transforms data. The data is represented as physical (electronic) quantities within the computing system's registers and memories and is transformed into other data similarly represented as physical quantities within the computing system's memories or registers or other such information storage, transmission, or display devices.

Exemplary Hardware in Accordance with the Present Invention

FIG. 1 is a block diagram of an embodiment of an exemplary computer system 100 used in accordance with the present invention. It should be appreciated that system 100 is not strictly limited to be a computer system. As such, system 100 of the present embodiment is well suited to be any type of computing device (e.g., server computer, portable computing device, desktop computer, mobile phone, pager, personal digital assistant, and the like). Within the following discussions of the present invention, certain processes and steps are discussed that are realized, in one embodiment, as a series of instructions (e.g., software program) that reside within computer readable memory units of computer system 100 and executed by a processor(s) of system 100. When executed, the instructions cause computer 100 to perform specific actions and exhibit specific behavior which is described herein.

Computer system 100 of FIG. 1 comprises an address/data bus 110 for communicating information, one or more central processors 102 coupled with bus 110 for processing information and instructions. Central processor unit(s) 102 may be a microprocessor or any other type of processor. The computer 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. System 100 also includes one or more signal generating and receiving devices 108 coupled with bus 110 for enabling system 100 to interface with other electronic devices and computer systems. The communication interface(s) 108 of the present embodiment may include wired and/or wireless communication technology. For example, within the present embodiment, the communication interface(s) 108 may be a serial communication port, a Universal Serial Bus (USB), an Ethernet adapter, a FireWire (IEEE 1394) interface, a parallel port, a small computer system interface (SCSI) bus interface, infrared (IR) communication port, Bluetooth wireless communication port, a broadband interface, or an interface to the Internet, among others.

Optionally, computer system 100 may include an alphanumeric input device 114 including alphanumeric and function keys coupled to the bus 110 for communicating information and command selections to the central processor(s) 102. The computer 100 can include an optional cursor control or cursor directing device 116 coupled to the bus 110 for communicating user input information and command selections to the central processor(s) 102. The cursor directing device 116 may be implemented using a number of well known devices such as a mouse, a track-ball, a track-pad, an optical tracking device, a touch screen, etc. Alternatively, it is appreciated that a cursor can be directed and/or activated via input from the alphanumeric input device 114 using special keys and key sequence commands. The present embodiment is also well suited to directing a cursor by other means such as, for example, voice commands.

The system 100 of FIG. 1 may also include one or more computer usable data storage devices 118 such as a magnetic or optical disk and disk drive (e.g., hard drive or floppy diskette) coupled with bus 110 for storing information and instructions. Furthermore, the data storage device(s) 118 may be, but is not limited to, a Zip drive, a memory stick, a compact disc (CD), smart media, a compact flash memory, a PC Card conforming to the Personal Computer Memory Card International Association (PCMCIA) specification, and a digital versatile disc (DVD), among others. An optional display device 112 is coupled to bus 110 of system 100 for displaying video and/or graphics. It should be appreciated that optional display device 112 may be a cathode ray tube (CRT), flat panel liquid crystal display (LCD), field emission display (FED), plasma display or any other display device suitable for displaying video and/or graphic images and alphanumeric characters recognizable to a user.

Exemplary Network in Accordance with the Present Invention

Figure 2:
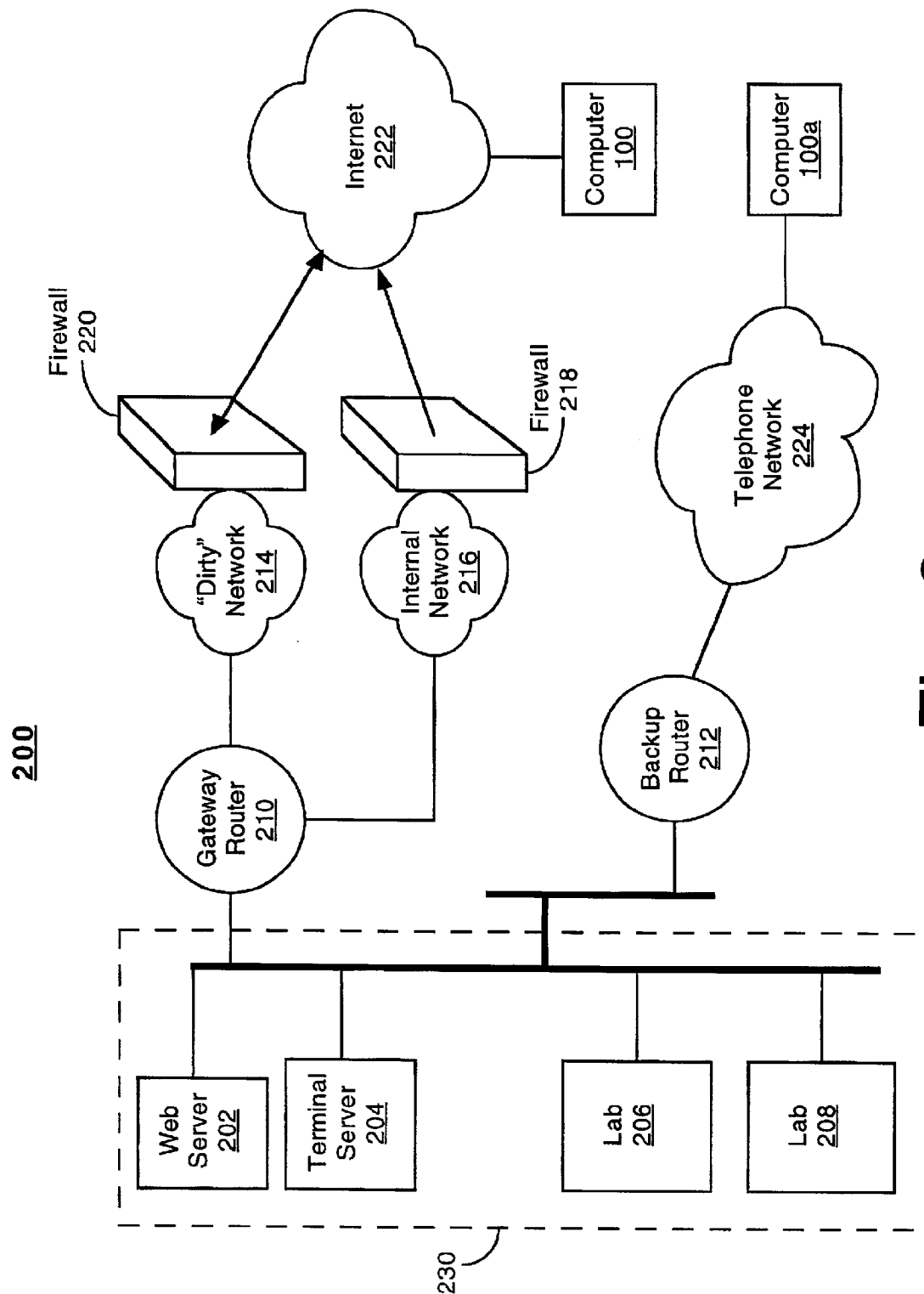
FIG. 2 is a block diagram of an exemplary network for providing a global product services electronic laboratory (E-Lab) in accordance with an embodiment of the present invention.

FIG. 2 is a block diagram of an exemplary network 200 for providing a global product services electronic laboratory (E-Lab) 230 in accordance with an embodiment of the present invention. The E-Lab 230 of the present embodiment is an on-line virtual laboratory that may be utilized by, but not limited to, company employees, field engineers and other interested individuals for learning how to implement and/or troubleshoot, for example, technology products via actual "hands-on" configurations. Specifically, the E-Lab 230 enables an authorized user to utilize a computing device to remotely access it via the Internet 222, a company network (e.g., internal network 216) or a dial-up connection (e.g., via telephone network 224). Once communicatively coupled to the E-Lab 230, the user may be provided a variety of different topics and categories associated with the products and/or equipment labs (e.g., 206 and 208) currently available within the E-Lab 230. After selecting one of the topics or categories, the user may be provided more specific information regarding tutorials and/or troubleshooting corresponding to the selected lab equipment (e.g., 206 or 208). Additionally, the user may also schedule a time slot in order to directly interact with the actual equipment of the selected lab (e.g., 206 or 208) on-line thereby having a "hands-on" learning experience. The E-Lab 230 is designed to support whatever type of interface the product or equipment supports and it also supports different types of products or equipment.

It should be understood that the E-Lab 230 leverages the technologies of the Internet 222 to bring training to an audience anytime, anywhere. The E-Lab 230 enables users to remotely access, for example, lecture content, access equipment virtually, learn and practice within the confines of their respective geographical locations. The E-Lab 230 also provides users access to real equipment that provides actual "hands-on" dynamic response for training and field support service for different products. The E-Lab 230 may also provide training that is comprehensive in its technology and product specific focus for learning. Users of E-Lab 230 are able to learn in real time, anywhere in the world on how a technology works and is specifically applied. For some training or support scenarios, multiple users or groups can access E-Lab 230 to view, modify and practice in real time. Users of E-Lab 230 also have the option to save, backup and/or restore their specific configurations for future use.

It is appreciated that E-Lab 230 of FIG. 2 is able to provide benefits to companies that implement it. For example, E-Lab 230 provides the benefit of reducing costs associated with delivering new technology and product training to a company's business partners and employees. Furthermore, E-Lab 230 also reduces costs by providing a centralized laboratory that may be accessed at any time from anywhere in the world. In this manner, the company does not have to purchase multiple numbers of the same equipment throughout dispersed geographical boundaries in order to provide technical training. Additionally, the E-Lab 230 reduces training costs associated with such things as travel, lodging, food and/or the lost opportunity costs of having the person away from their work responsibilities for one or more days. Moreover, E-Lab 230 is based on web technologies and utilizes the Internet 222 as a distribution vehicle, the cost associated with signing up to E-Lab is nominal. For example, most technology companies have direct access to the Internet 222 and the number of users who access the Internet 222 via home broadband or dial-up is ever increasing. Another benefit is that E-Lab 230 may be available to users 24 hours a day, 7 days a week. In this manner, worldwide training is enhanced since the E-Lab 230 may be accessed at any time convenient to the user.

The E-Lab 230 may be implemented to utilize the Internet 222 in order to provide its users access. As such, a user of a computing device (e.g., 100) may access E-Lab 230 via the Internet 222 from anywhere, anytime by entering its corresponding web address, e.g., a Uniform Resource Locator (URL), into the address or location field of a web browser (e.g., Microsoft Internet Explorer®, Netscape Navigator®, and the like). However, for users of a computing device (e.g., 100a) who do not have access to the Internet 222, existing analog dial-up technology of telephone network 224 may also be used to access the E-Lab 230. It is appreciated that the dial-up connection via telephone network 224 provides a field service engineer the opportunity to communicate with the E-Lab 230 in order to verify product configurations or test parameters while at a customer site even if the customer has lost connectivity to the Internet 222. As long as the customer site has access to telephone network 224, communication with E-Lab 230 is possible. Additionally, If a local area network (LAN) connection to the Internet 222 was not available or a user was unable to connect to Internet 222 via an Internet Service Provider (ISP) or company network, the user could still access the E-Lab 230 by causing their computing device to dial directly to web server 202 via telephone network 224.

Within the present embodiment of FIG. 2, E-Lab 230 may also enable users of computing devices (e.g., 100 and/or 100a) to remotely access its different labs (e.g., 206 and 208) via prioritized scheduling logic. For example, the prioritized scheduling logic may operate on, but is not limited to, a web server 202 of E-Lab 230. Specifically, the web server 202 may provide prioritized scheduling to users of computing devices 100 and/or 100a by providing one or more web pages implemented with, but not limited to, Java programming, among others. Within E-Lab 230, it is understood that there are a wide variety of ways for managing access to the lab equipment of its different labs (e.g., 206 and 208). For example, management access to the lab equipment of labs 206 and 208 may include various techniques such as, but not limited to, web server 202 (e.g., utilizing a JAVA tool), a terminal server 204 (e.g., utilizing Microsoft Terminal Services®), or direct telnet access via telephone network 224. It is appreciated that as technologies evolve, the management access of E-Lab 230 may encompass a wider variety of technologies.

When a user of a computing device (e.g., 100 or 100a) accesses E-Lab 230, the session may be logged and monitored by web server 202 based on registration and sign-on parameters. During the session, the E-Lab 230 may take a student through product configurations and/or troubleshooting processes based on defined lessons that may include step-by-step instructions. Therefore, the E-Lab 230 provides a truly electronic learning (E-Learning) environment where students may receive all the benefits of instructor led classroom training in the comfort of their own particular time and locations throughout the world.

By providing a worldwide electronic learning environment, the E-Lab 230 of FIG. 2 allows a field engineer of a product to become a field service expert in real time. As such, when a field problem occurs, a field engineer may access the E-Lab 230 to learn a product's specific features, get accustomed with the product's access method, e.g., command-line interface (CLI), menu interface, graphical user interface. (GUI), etc., and utilize troubleshooting features in order to debug and identify a solution. With the E-Lab 230, real time troubleshooting capabilities are possible because users access actual equipment to replicate specific scenarios (e.g., data network traffic). For example, the E-Lab 230 equipment may provide the full command capabilities of the individual equipment software to configure, monitor and troubleshoot a problem in real time. Furthermore, even if a field engineer is not dealing with a specific problem, access to the actual equipment and/or product provides a way that the field engineer may learn and familiarize him or herself with a product remotely. Therefore, E-Lab 230 may improve the proficiency of field engineers and thereby increase a company's customer satisfaction.

To initially use E-Lab 230, a user of a computing device (e.g., 100 or 100a) may need to register into a local database of web server 202 in order to be authorized to access the labs 206 and 208. During the registration process, the web server 202 may request (via computer 100 or 100a) that the user provide different parameters such as his or her name, the company that he or she is associated with, job title, log-in identification (ID), purpose of access, e-mail address, telephone number and any other pertinent information. Once the user is registered and authorized, web server 202 provides the user (via computer 100 or 100a) a lab scheduling system wherein one or more time slots may be scheduled for one or more labs (e.g., 206 and/or 208). Within the present embodiment, web server 202 may also utilize a priority system that operates in conjunction with the lab scheduling system. For example, if a higher priority user needs to access a lab (e.g., 206 or 208) and it conflicts with a lower priority user's time slot, the lab priority system operating on web server 202 can bump the lower priority user out of that scheduled time slot. If this occurs before the scheduled time slot, web server 202 may transmit a message (e.g., via e-mail) to the lower priority user notifying him or her of the situation thereby enabling the user to reschedule access to the lab (e.g., 206 or 208).

However, in the situation where the lower priority user is currently using the lab (e.g., 206 or 208) and is going to be bumped off, he or she may not be immediately removed from the lab. Instead, web server 202 of FIG. 2 may provide a window message to the user indicating that he or she is about to be bumped out of the lab (e.g., 206 or 208) and has a predefined amount of time (e.g., 5 minutes) to save any work. After the predefined amount of time elapses, the lower priority user will no longer have access to that particular lab (e.g., 206 or 208) during that time slot session. It should be pointed out that the parameters that the user provides (e.g., name, company, job title, log-in ID, purpose of access, e-mail address, telephone number, etc.) during his or her registration may be utilized by the priority system to determine the prioritization of that user when a time slot for lab access is scheduled.

It is appreciated that the lab priority system operating on web server 202 may be designed in a way to support product services from the field. For example, the lab scheduler may provide a priority determination and access determination scheme that allows higher-priority users (such as field engineers at a customer site that are working on critical issues) preference over low-priority users (such as users at home accessing the E-Lab 230) for lab equipment access. Through the registration and log-in procedures of E-Lab 230, the lab priority scheduler operating on web server 202 is able to distinguish between higher priority users that need access to lab equipment as soon as possible and (if needed) subsequently logging out lower priority users from that lab equipment and notify the parties of this transaction.

Alternatively, the lab priority system operating on web server 202 of FIG. 2 may be designed to utilize the following criteria to determine user priority. For example, user access may be prioritized from highest to lowest as follows: 1) critical on-site services customer field issues; 2) third party maintenance field engineers and on-site services engineer training; 3) product services qualification usage; and 4) miscellaneous company wide or external E-Learning. Therefore, users that fall into lower priority levels are expected to yield to higher priority users.

Within another embodiment, the lab priority scheduler operating on web server 202 may be designed to assign a priority level or status to each user based on one or more criteria. For example, a users assigned priority level or status may be determined utilizing the user's registration information (e.g., name, company, job title, purpose of access, etc.). As such, a maintenance field engineer may be assigned to a higher priority level than someone interested in casual E-Learning.

After the user has been registered and authorized, another embodiment of the lab priority system operating on web server 202 may provide the user (via computer 100 or 100*a*) the ability to select his or her particular priority level associated with one or more labs (e.g., 206 and/or 208). Once the priority level has been received, the lab priority scheduler may then determine whether the selected user priority level is legitimate for that user. It is understood that the lab priority scheduler operating on web server 202 may determine if the user selected priority level is appropriate in a wide variety of ways in accordance with an embodiment of the present invention. For example, the lab priority scheduler may check the user's registration information (e.g., name, company, job title, purpose of access, etc.) in order to determine whether the user selected priority level is appropriate for the user.

Within FIG. 2, the E-Lab 230 may also provide a field support tool which is an interactive step-by-step instruction tool that may take a user through possible resolutions by narrowing down choices through a series of short questions. It is appreciated that the field support tool may be implemented in a wide variety of ways in accordance with the present embodiment. For example, the field support tool may be implemented in the form of web pages that enable a user to drill down to possible answers for troubleshooting hardware and/or software problems.

It should be understood that E-Lab 230 of the present embodiment may be focused on real-time or just in time learning of new technologies. Specifically, E-Lab 230 may be a dynamic working lab with real equipment (e.g., routers, switches, servers, firewalls, gateways, etc.) that can be accessed in real time. Any change to the topology or configuration instantaneously affects the outcome of the lab (e.g., 206 or 208). Furthermore, as the rate of change of new technologies continues to grow, the development of the content within E-Lab 230 is flexible enough to grow alongside the changes. That is, within the E-Lab 230 there is a short turnaround to upgrade hardware and/or software, implement changes, and/or add new features to an existing lab (e.g., 206 or 208). Therefore, the E-Lab 230 has the capability to be adaptive to the fast paced technology and requirement updates.

As described herein, a user can access the content in E-Lab 230 of FIG. 2 and go through iterative steps in order to learn a technology and product. However, the E-Lab 230 may also be more than a learning tool. For example, E-Lab 230 may also be used to support field services. The equipment of E-Lab 230 may be designed to assist field services support areas such as initial installation, maintenance, break/fix and troubleshooting functions. Additionally, the equipment topology of E-Lab 230 may be fixed or dynamic, depending on how it is being applied. Therefore, users may access E-Lab 230 in order to test and troubleshoot their own particular solutions of products within the confines of the topologies of E-Lab 230. As such, this makes E-Lab 230 more than just a static learning tool, it may also be a dynamic support tool as well as a learning tool.

The E-Lab 230 of the present embodiment gives users real "hands-on" feel of the physical equipment itself. This allows initial bring up of a pre-defined technology solution with a specific product and technology, e.g., optical, Content Delivery Network (CDN), Architecture for Voice, Video and Integrated Data (AVVID), Digital Subscriber Line (DSL), Storage Area Network (SAN), Long Reach Ethernet (LRE), etc. The equipment in the E-Lab 230 is physically present, is coupled to power (if needed) and may be actually physically connected to other equipment in order to represent a real topology. It is pointed out that the E-Lab 230 is not a simulation of products and/or equipment. Instead, E-Lab 230 is a real lab with real equipment. For example, real customer network environments may be emulated within E-Lab 230; network topology and configuration can be created and modified by users. Furthermore, E-Lab 230 has the capability to be updated as technology changes and as, for example, new software/hardware features are introduced. Moreover, E-Lab 230 is capable of supporting multiple hardware/software versions instantaneously with live equipment.

Within FIG. 2, the real time troubleshooting capabilities of E-Lab 230 are apparent because it may be complete with comprehensive debug capabilities in live, for example, network traffic scenarios due to its full command capabilities, such as a full set of Internetwork Operating System (IOS) commands and features. Additionally, E-Lab 230 may take a user through well-defined lab training modules, but this does not restrict the user from trying out other product configuration parameters beyond the existing lab contents. Since E-Lab 230 utilizes live equipment, the user has a full range of possible product configuration options available to choose from. Therefore, if a user were to provide a valid command to a piece of equipment within E-Lab 230, there would be an outcome to the command since there is interaction with real equipment. As such, E-Lab 230 give users the opportunity to use the full features (for example) of command parameters for product configuration or troubleshooting.

Another avenue to assist in troubleshooting for the E-Lab 230 may include the field support tool which may focus on field service installation troubleshooting. Specifically, the field support tool in E-Lab 230 is particularly developed to drill down to the troubleshooting steps for an installation and break/fix type of solution. Coupled with the access to real equipment, the user of E-Lab 230 may enter commands of possible solutions presented by the Field Support Tool on live equipment. Furthermore, this functionality is provided in a fully managed and administered "safe and secured" lab environment, not on a customers actual product (e.g., live network).

Within FIG. 2, there are three ways for a user to access E-Lab 230. For example, a user may utilize a computing device (e.g., 100) to access E-Lab 230 via the Internet 222.

Specifically, the user of computing device 100 may enter into a web browser the web address of the web server 202 of E-Lab 230. As such, computing device 100 communicatively couples to the web server 202 via the Internet 222, firewall 220, "dirty" network 214 and gateway router 210. Within the present embodiment, the "dirty" network 214 is considered to be the zone between an internal network 216 (e.g., a highly secured company network) and the Internet 222. As such, an external user may just access E-Lab 230 and specific technology equipment resident on dirty network 214.

Once computer 100 is coupled to web server 202 via the Internet 222, the web server 202 provides a home page to computer 100 that may include a lab catalog about the available labs (e.g., 206 and 208), a mission statement for E-Lab 230, request for user registration information (if needed), technical resource links, instructions on using E-Lab 230, request for user identification (ID), and any other pertinent information. The registration process may include any or all of the information described herein. Within the present embodiment, it is appreciated that a user may need to register and log-in in order to use E-Lab 230. Once the user has been registered and authorized, the web server 202 may store that information within a user database for future reference. The user database may be local to the web server 202 or resident in an Access Control Server (not shown). Subsequently, web server 202 may then provide the user his or her password (via the Internet 222 and computer 100) to be used during a log-in procedure.

Once logged-in, web server 202 enables the user to learn more about the available labs (e.g., 206 and 208) along with their corresponding training and tutorials via computer 100. Additionally, web server 202 may also provide the user a lab scheduler via computer 100 wherein he or she is able to schedule one or more future time slots for utilizing one or more of the available labs (e.g., 206 and 208) of E-Lab 230. It is understood that the lab scheduler operating on web server 202 may be implemented in a manner similar to that described herein. Furthermore, the priority system described herein may operate on web server 202 in conjunction with the lab scheduler. Once the user selects via computer 100 one or more time slots for one or more of the available labs (e.g., 206 and 208), the web server 202 stores this information. Once the user schedules a specific time slot, he or she may then access the E-Lab 230 at that time. It is appreciated that the user is able to utilize (via computing device 100) the actual product or equipment of the scheduled lab (e.g., 206 or 208) for training, troubleshooting and/or technical support as described herein.

A second way the E-Lab 230 of FIG. 2 may be accessed by a user utilizing a computing device (e.g., 100a) is via the telephone network 224. Specifically, the user of computing device 100 may cause it to dial the phone access number to reach the web server 202 of E-Lab 230. As such, computing device 100 communicatively couples to the web server 202 via the telephone network 224 and backup router 212. Once computer 100 is coupled to web server 202 via telephone network 224, the web server 202 and computer 100 may operate in a manner similar to when computer 100 is coupled to web server 202 via the Internet 222 described herein. The telephone network 224 of the present embodiment may be implemented using wired and/or wireless technologies. For example, the telephone network 224 may be implemented as a T1 Primary Rate Interface (PRI) Integrated Services Digital Network (ISDN). Furthermore, the computing device 100 may establish a communication session with web server 202 via telephone network 224 in a wide variety of ways in accordance with the present embodiment. For example, a Point-to-Point Protocol (PPP) session may be negotiated and established using Challenge Handshake Authentication Protocol (CHAP) authentication when computing device 100 dials into the backup router 212 to access the web server 202. Once the computing device 100 has successfully negotiated the PPP session and receives an Internet Protocol (IP) address from the backup router 212, TCP/IP connectivity is fully established into E-Lab 230.

A third way the E-Lab 230 may be accessed by a user utilizing a computing device is via an internal network (e.g., 216). It should be understood that internal network 216 may be an internal network of a company. Specifically, the user of a computing device (not shown) coupled to internal network 216 may enter into a web browser the web address of the web server 202 of E-Lab 230. As such, the computing device communicatively couples to the web server 202 via the gateway router 210. Once the computing device is coupled to web server 202 via gateway router 210, the web server 202 and computing device may operate in a manner similar to when computer 100 is coupled to web server 202 via the Internet 222 described herein. It is appreciated that the computing device may be implemented in a manner similar to computer 100 of FIG. 1 described herein.

Once a computing device (e.g., 100 or 100a) has logged-in to web server 202 of FIG. 2 during a scheduled time slot, web server 202 allows the computing device to directly access the scheduled lab (e.g., 206 or 208) for one or more of the reasons described herein. However, this type of operation may not work properly with some lab equipment or product. For example, management software of a particular lab equipment may not allow it to communicate through a firewall (e.g., 220). Therefore, the computing device (e.g., 100 or 100a) would not be allowed to communicate with that particular lab equipment. In order to remedy this situation, terminal server 204 is provided as a proxy device for the computing device (e.g., 100 or 100a). Specifically, if the computing device (e.g., 100 or 100a) selects a lab (e.g., 206 or 208) that will not communicate through firewall 220, web server 202 provides a mechanism to allow the computing device to communicate with terminal server 204. As such, the computing device (e.g., 100 or 100a) communicates with the desired lab (e.g., 206 or 208) via terminal server 204. Therefore, since the terminal server 204 and the desired lab (e.g., 206 or 208) are located on the same physical network and are not separated by a firewall, the desired lab freely communicates with terminal server 204 which freely communicates with the computing device (e.g., 100 or 100a). The terminal server 204 may be implemented using Microsoft Terminal Service®.

Within the present embodiment of network 200, web server 202 may enable a user of a computing device (e.g., 100 or 100a) to submit it questions regarding E-Lab 230 and/or any of the products or equipment associated with the labs (e.g., 206 and 208). Specifically, web server 202 may provide a web page where a user may submit a question via computing device (e.g., 100 or 100a). Subsequently, web server 202 may utilize one or more databases in order to provide an answer to the user via the computing device. Alternatively, web server 202 may store or transfer the question to a location where it may be accessed by one or more experts of the E-Lab 230 and/or of any of the products or equipment located within the labs (e.g., 206 and 208). The expert(s) may then craft an answer to the submitted question and then transmit it to the user's account associated with E-Lab 230 or maybe via the user's email address.

Furthermore, web server 202 of FIG. 2 may also enable a user of a computing device (e.g., 100 or 100a) to submit feedback regarding E-Lab 230 and/or any of the products or equipment located within the labs (e.g., 206 and 208). Specifically, web server 202 may provide a feedback web page where a user may submit feedback to it via computing device (e.g., 100 or 100*a*). It should be appreciated that the feedback may include, but is not limited to, problems (or bugs) associated with E-Lab 230 or suggestions. Additionally, the web based tool provided by web server 202 may also enable the user to select the severity (e.g., minor, major, or catastrophic) of the problem being reported. Subsequently, web server 202 submits the feedback to the E-Lab team which will try to solve the reported problem or maybe implement a particular suggestion.

The E-Lab 230 may allow field engineers and/or users of a computing device (e.g., 100 or 100*a*) to change the configuration of particular lab equipment within the lab (e.g., 206 or 208) in order to emulate the real environment they are facing. It should be pointed out that web server 202 may store a master configuration of each piece of equipment or product located with labs 206 and 208 of E-Lab 230. Therefore, when a field engineer or user accesses E-Lab 230 via computing device (e.g., 100 or 100*a*), he or she may copy the master configuration for a piece of equipment or a product in order to learn about it or for troubleshoot purposes. For example, a user of the computing device (e.g., 100 or 100*a*) is able to copy a master configuration and may utilize it to recover a product or system that has crashed. Additionally, the master configuration may be compared to a customer's configuration for supporting or troubleshooting.

Additionally, web server 202 of FIG. 2 may also receive and store a user's product configuration for future reference via a computing device (e.g., 100 or 100*a*). For instance, once the user has a configuration that works for him or her, the user can have web server 202 store a copy within the user database for future use. Later, the user of the computing device (e.g., 100 or 100*a*) can use that configuration copy to restore his or her system or use it in the E-Lab 230 to try to determine why the product or system has problems. However, the user may also refer to the stored product configuration in order to continue training. It is understood that the user's product configuration may also be stored by the Access Control Server (not shown). It should be appreciated that once a user is done interacting with lab equipment of E-Lab 230, web server 202 automatically replaces the users configuration of the lab equipment with the master configuration thereby keeping the lab equipment properly operating.

The network 200 of FIG. 2 includes computer 100 and firewalls 218 and 220 which are each coupled to the Internet 222. The firewalls 218 and 220 are coupled to an internal network 216 and "dirty" network 214, respectively. It is understood that firewalls 218 and 220 are implemented in order to protect internal network 216 and "dirty" network 214, respectively, from allowing any malicious users access. A gateway router 210 is coupled to internal network 216 and dirty network 214. The labs 206 and 208, web server 202, and terminal server 204 are coupled to gateway router 210. Additionally, the labs 206 and 208, web server 202, and terminal server 204 are coupled so that they may communicate. Furthermore, a backup router 212 is coupled to labs 206 and 208, web server 202, terminal server 204 and gateway router 210. The backup router 212 is coupled to telephone network 224 which may be coupled to computer 100*a*. It is understood that E-Lab 230 may include, but is not limited to, web server 202, terminal server 204, and labs 206 and 208. Moreover, E-Lab 230 of the present embodiment is well suited to have any number of laboratories similar to labs 206 or 208. The web server 202 and terminal server 204 of the present embodiment may each be implemented as one or more physical devices.

Within network 200 of the present embodiment, computer 100 may be communicatively coupled to the Internet 222 via wired and/or wireless communication technologies. Computer 100*a* may be communicatively coupled to the telephone network 224 via wired and/or wireless communication technologies. It is appreciated that all of the devices (e.g., 202–230) of network 200 may be coupled utilizing wired and/or wireless communication technologies. The web server 202, terminal server 204 and computer 100*a* may be implemented within the present embodiment in a manner similar to computer 100 of FIG. 1, described herein.

Exemplary Operations in Accordance with the Present Invention

Figure 3:
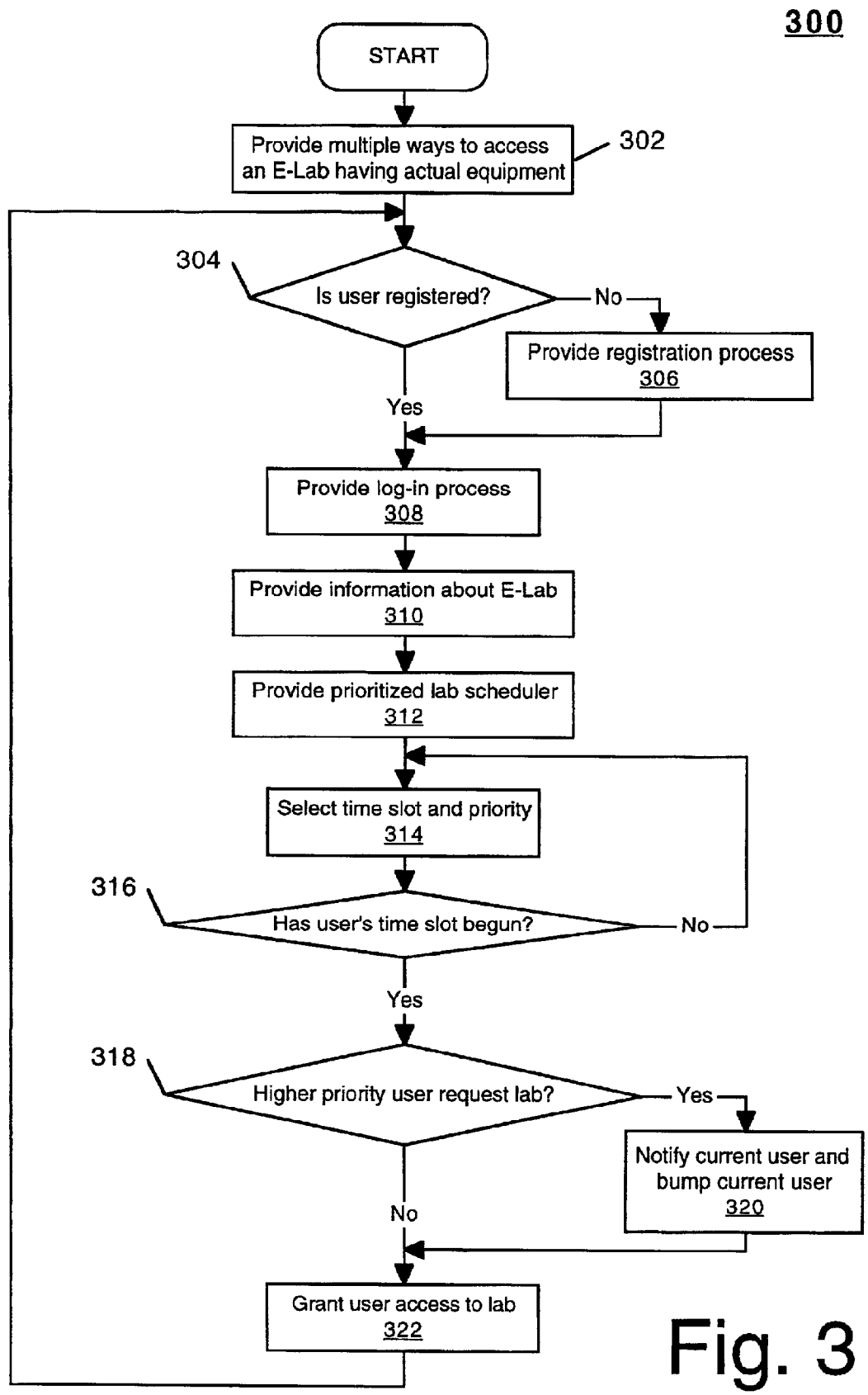
FIG. 3 is a flowchart of steps performed in accordance with an embodiment of the present invention for providing an E-Lab that may be utilized for training individuals to learn about technology theory and/or new products.

FIG. 3 is a flowchart 300 of steps performed in accordance with an embodiment of the present invention for providing an E-Lab (e.g., 230) that may be utilized for training individuals to learn about technologies and/or new products. Flowchart 300 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific steps are disclosed in flowchart 300, such steps are exemplary. That is, the present embodiment is well suited to performing various other steps or variations of the steps recited in FIG. 3. Within the present embodiment, it should be appreciated that the steps of flowchart 300 may be performed by software, by hardware, or by any combination of software and hardware.

Within the present embodiment, an E-Lab (e.g., 230) is provided which is an on-line virtual laboratory that may be utilized by, but not limited to, company employees, field engineers and other interested individuals for learning how to implement and/or troubleshoot, for example, technology products via actual "hands-on" configurations. Specifically, the E-Lab enables an authorized user to utilize a computing device (e.g., 100 or 100*a*) to remotely access it via the Internet (e.g., 222), a company network (e.g., internal network 216) or a dial-up connection (e.g., via telephone network 224). Once communicatively coupled to the E-Lab, the user goes through a registration process (if it has not already been done). Once registered, the user of the computing device is then able to use a log-in process to enter the E-Lab. After logging-in, the user may be provided a variety of different topics and categories associated with the products and/or equipment labs (e.g., 206 and 208) currently available within the E-Lab. After selecting one of the topics or categories, the user may be provided more specific information regarding tutorials and/or troubleshooting corresponding to the selected lab equipment (e.g., 206 or 208). Additionally, the user may also schedule a time slot in order to directly interact on-line with the actual equipment of the selected lab (e.g., 206 or 208) thereby having a "hands-on" learning experience. The E-Lab is designed to support whatever type of interface the lab product or equipment supports and it also supports different types of products or equipment.

In step 302 of FIG. 3, an E-Lab (e.g., 230) is provided which is an on-line virtual laboratory that may be utilized by, but not limited to, company employees, field engineers and other users for learning how to implement and/or troubleshoot, for example, technology products via actual "hands-n" configurations. The E-Lab at step 302 enables a user to utilize a computing device (e.g., 100 or 100a) to remotely access it via the Internet (e.g., 222), a company network (e.g., internal network 216) or a dial-up connection (e.g., via telephone network 224). It is appreciated that the user of the computing device (e.g., 100 or 100a) may access the E-Lab at step 302 in any manner similar to that described herein. Additionally, the E-Lab (e.g., 230) at step 302 may be implemented in any manner similar to that described herein.

At step 304, the present embodiment determines whether the user of the computing device (e.g., 100 or 100a) has been registered with the E-Lab (e.g., 230). If the present embodiment determines at step 304 that the user of the computing device (e.g., 100 or 100a) has been registered with the E-Lab (e.g., 230), the present embodiment proceeds to step 308. However, if the present embodiment determines at step 304 that the user of the computing device (e.g., 100 or 100a) has not been registered with the E-Lab (e.g., 230), the present embodiment proceeds to step 306. It is understood that the registration determination at step 304 may be performed by a server (e.g., 202) of the E-Lab (e.g., 230).

In step 306 of FIG. 3, the present embodiment provides the user of the computing device (e.g., 100 or 100a) a registration process. The registration process at step 306 may be implemented in a wide variety of ways in accordance with an embodiment of the present invention. For example, during the registration process at step 306, the present embodiment may provide the user via the computing device a registration web page where different information associated with the user may be provided. For example, the registration information may include, but is not limited to, the user's name, the company that the user is associated with, log-in ID, purpose of access, user's e-mail address, user's telephone number and any other pertinent information. It is appreciated that the registration process at step 306 may be implemented in any manner similar to that described herein. Furthermore, the registration process at step 306 may be provided by a server (e.g., 202) of the E-Lab (e.g., 230).

At step 308, the present embodiment provides a log-in process for the E-Lab (e.g., 230) to the user of the computing device (e.g., 100 or 100a). The log-in process at step 308 may be implemented in a wide variety of ways in accordance with an embodiment of the present invention. For example, the log-in process at step 308 may include the present embodiment requesting that the user provide his or her user ID and password via the computing device (e.g., 100 or 100a). Once the log-in process at step 308 is successfully completed, the present embodiment grants the user access to the E-Lab (e.g., 230). It is understood that the log-in process at step 308 may be implemented in any manner similar to that described herein.

At step 310 of FIG. 3, the present embodiment provides the user via computing device (e.g., 100 or 100a) a variety of different topics and categories associated with the products and/or equipment labs (e.g., 206 and 208) available within the E-Lab (e.g., 230). Furthermore, the information presented at step 310 may also include, but is not limited to, specific information regarding tutorials and/or troubleshooting corresponding to selected lab equipment (e.g., 206 or 208). The presentation of information corresponding to the E-Lab at step 310 may be implemented in any manner similar to that described herein.

In step 312, the present embodiment provides the user a prioritized lab scheduler via the computing device (e.g., 100 or 100a) wherein the user may select one or more priorities and/or one or more specific time slots for directly interacting on-line with the actual equipment of one or more of the available labs (e.g., 206 or 208). It is appreciated that the prioritized lab scheduler of step 312 may be implemented in a wide variety of ways in accordance with an embodiment of the present invention. For example, the functionality of the prioritized lab scheduler at step 312 may be implemented in any manner similar to that described herein.

At step 314 of FIG. 3, the present embodiment receives via the computing device (e.g., 100 or 100a) the one or more user selected priorities and/or one or more user selected time slots for directly interacting on-line with the actual equipment of one or more of the available labs (e.g., 206 or 208). It should be understood that the present embodiment at step 314 may also determine the appropriateness of the user selected priority or priorities. For example, the present embodiment at step 314 may determine the appropriateness of the user selected priority or priorities in a manner similar to that described herein. However, the present embodiment at step 314 may determine the appropriateness of the user selected priority or priorities in a wide variety of ways in accordance with an embodiment of the present invention.

At step 316, the present embodiment determines whether the user's scheduled time slot has substantially begun. If the present embodiment determines at step 316 that the user's scheduled time slot has substantially begun, the present embodiment proceeds to step 318. However, if the present embodiment determines at step 316 that the user's scheduled time slot has not substantially begun, the present embodiment proceeds to the beginning of step 314 where the user may reselect a different time slot with associated priority with the same lab or the user may select future time slots with associated priority or priorities for different labs. It should be pointed out that if the user does not desire to select a future time slots and/or priority at step 314, he or she may use the computing device (e.g., 100 or 100a) to log-out from the E-Lab (e.g., 230). Consequently, the user of the computing device may later access the E-Lab again and go through the log-in process at step 308. After completing the log-in process at step 308, the present embodiment may allow the user to proceed to step 316.

In step 318 of FIG. 3, the present embodiment determines whether a higher priority user has requested a lab (e.g., 206 or 208) with the time slot that has been reserved by a lower priority user. If the present embodiment determines at step 318 that no higher priority user has requested the selected lab (e.g., 206 or 208), the present embodiment proceeds to step 322. However, if the present embodiment determines at step 318 that a higher priority user has requested a lab (e.g., 206 or 208) with the time slot that has been reserved by a lower priority user, the present embodiment proceeds to step 320. The functionality of determining the priority status of the user at step 318 may be implemented in any manner similar to that described herein.

At step 320, the present embodiment notifies the current lower priority user who has the reserved time slot that he or she is about to be bumped out of the lab in order to allow a higher priority user access to the lab. Subsequently, the present embodiment at step 320 bumps the lower priority user out of the lab (e.g., 206 or 208) during that time slot. It is understood that step 320 may be performed in diverse ways in accordance with an embodiment of the present invention. For example, the current lower priority user of the lab may be notified and bumped from the lab (e.g., 206 or

208) at step 320 by the present embodiment in any manner similar to that described herein.

At step 322, the present embodiment grants the user access to the lab (e.g., 206 or 208) of the E-Lab (e.g., 230) via the computing device (e.g., 100 or 100*a*). Upon receiving access to the lab at step 322, the user may directly interact on-line with the actual equipment of the selected lab (e.g., 206 or 208) via the computing device (e.g., 100 or 100*a*) thereby having a "hands-on" learning experience. The E-Lab (e.g., 230) is designed to support different types of product or equipment interfaces and it also supports different types of products or equipment. At step 322, the providing of access to the lab (e.g., 206 or 208) of the E-Lab (e.g., 230) may be implemented in any manner similar to that described herein.

Accordingly, the present invention provides a method and system for training individuals to learn about technologies and/or new products which provides a way to have questions answered, provides theoretical knowledge along with applied knowledge and is not tedious. Moreover, the present invention provides a method and system which satisfies the above mentioned accomplishment and does not require an individual to travel to a distant location. Furthermore, the present invention provides a method and system which satisfies the above mentioned accomplishments and does not involve simulation, but instead provides real-time physical access to actual equipment. The present invention also provides a method and system which satisfies the above mentioned accomplishments and is not limited to just providing a command-line interface to the product. Additionally, the present invention provides a method and system which satisfies the above mentioned accomplishments and provides more than one communication path to access the training.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for providing an electronic laboratory for learning purposes that includes a physical product having an interface that is utilized by a remote computing device, said method comprising:

establishing said electronic laboratory to include said physical product;

enabling said remote computing device to communicate with said electronic laboratory and said physical product via a first communication network or a second communication network that does not involve said first communication network;

restricting access to said physical product by providing a log-in process;

scheduling a time slot wherein said remote computing device may interact with said physical product; and in response to said time slot substantially beginning, enabling said remote computing device to interact with said interface of said physical product of said electronic laboratory for learning purposes.

2. The method as described in claim 1 further comprising:

determining an access priority to said physical product of said electronic laboratory for a plurality of remote computing devices; and implementing said access priority.

3. The method as described in claim 1 further comprising:

providing training information associated with said physical product.

4. The method as described in claim 1 further comprising:

providing troubleshooting information associated with said physical product.

5. The method as described in claim 1 further comprising:

restricting access to said physical product by providing a registration process.

6. The method as described in claim 1 wherein said physical product is a router, a switch, a server, a firewall, or a gateway.

7. The method as described in claim 1 wherein said first communication network is the Internet.

8. The method as described in claim 1 wherein said second communication network is a telephone network.

9. The method as described in claim 1 further comprising:

enabling said remote computing device to communicate with said electronic laboratory and said physical product via a third communication network that does not involve said first communication network and said second communication network.

10. The method as described in claim 9 wherein said third communication network is an internal network.

11. The method as described in claim 1 wherein said remote computing device is a computer, a portable computing device, a personal digital assistant, a mobile phone, a server computer or a pager.

12. A computer readable medium having computer readable code embodied therein for causing a system to perform:

enabling a remote computing device to communicate with an interface of a physical product of an electronic laboratory via a first communication network or a second communication network that does not involve said first communication network;

restricting access to said physical product by providing a log-in process;

scheduling a time slot wherein said remote computing device may access said interface of said physical product; and in response to said time slot substantially beginning, enabling said remote computing device to access said interface of said physical product of said electronic laboratory for learning purposes.

13. The computer readable medium as described in claim 12 further comprising:

determining an access priority to said physical product of said electronic laboratory for a plurality of remote computing devices; and implementing said access priority.

14. The computer readable medium as described in claim 12 further comprising:

providing training information associated with said physical product.

15. The computer readable medium as described in claim 12 further comprising:

providing troubleshooting information associated with said physical product.

16. The computer readable medium as described in claim 12 further comprising:

restricting access to said physical product by providing a registration process.

17. The computer readable medium as described in claim 12 wherein said physical product is a router, a switch, a server, a firewall, or a gateway.

18. The computer readable medium as described in claim 12 wherein said first communication network is selected from a telephone network, an internal network or the Internet.

19. The computer readable medium as described in claim 12 wherein said remote computing device is selected from the group consisting of a computer, a portable computing device, a personal digital assistant, a mobile phone, a server computer and a pager.

20. A system for providing an electronic laboratory for learning purposes including a physical product having an interface that is utilized by a remote computing device, said system comprising:

said electronic laboratory including said physical product having said interface;

a server coupled to said physical product and for providing and controlling access to said physical product, said server enables scheduling of a time slot wherein said remote computing device may interact with said physical product, said server to restrict access to said physical product by providing a log-in process;

a first communication network coupled to said server and for enabling said remote computing device to communicate with said server and said physical product; and a second communication network that does not involve said first communication network, said second communication network coupled to said server and for enabling said remote computing device to communicate with said server and said physical product.

21. The system as described in claim 20 further comprising:

a third communication network that does not involve said first communication network and said second communication network, said third communication network coupled to said server and for enabling said remote computing device to communicate with said server and said physical product.

22. The system as described in claim 21 wherein said first communication network comprises the Internet.

23. The system as described in claim 22 wherein said second communication network comprises a telephone network.

24. The system as described in claim 23 wherein said third communication network comprises an internal network.

25. The system as described in claim 20 wherein said physical product is a router, a switch, a second server, a firewall, or a gateway.

26. The system as described in claim 20 wherein said server determines and implements an access priority to said physical product of said electronic laboratory for a plurality of remote computing devices.

27. A system for providing an electronic laboratory means for learning purposes including a physical product means having an interface means that is utilized by a remote computing device means, said system comprising:

said electronic laboratory means including said physical product means;

means for enabling said remote computing device means to communicate with said electronic laboratory means and said physical product means via a first communication means or a second communication means that does not involve said first communication means;

means for restricting access to said physical product means by providing a log-in process;

means for scheduling a time slot wherein said remote computing device means may interact with said physical product means; and in response to said time slot substantially beginning, means for enabling said remote computing device means to interact with said interface means of said physical product means of said electronic laboratory means for learning purposes.

28. The system as described in claim 27 further comprising:

means for determining an access priority to said physical product means of said electronic laboratory means for a plurality of remote computing devices means; and means for implementing said access priority.

29. The system as described in claim 27 further comprising:

means for providing training information associated with said physical product means.

30. The system as described in claim 27 further comprising:

means for providing troubleshooting information associated with said physical product means.

31. The system as described in claim 27 further comprising:

means for restricting access to said physical product means by providing a registration process.

32. The system as described in claim 27 wherein said physical product means is a router, a switch, a server, a firewall, or a gateway.

33. The system as described in claim 27 wherein said first communication means is selected from a telephone network means, a internal network means or an Internet means.

34. The system as described in claim 27 further comprising:

means for enabling said remote computing device means to communicate with said electronic laboratory means and said physical product means via a third communication means that does not involve said first communication means and said second communication means.

35. The system as described in claim 27 wherein said remote computing device means is selected from the group consisting of a computer means, a portable computing device means, a personal digital assistant means, a mobile phone means, a server computer means and a pager means.

* * * * *